(No Model.) 6 Sheets—Sheet 1.

E. ESTIENNE.
MORSE REGISTER.

No. 314,525. Patented Mar. 24, 1885.

Witnesses: John E. Parker
Harry Drury

Inventor:
Edouard Estienne
by his Attorneys
Howson and Son (No Model.)  6 Sheets—Sheet 2.

E. ESTIENNE.
MORSE REGISTER.

No. 314,525.  Patented Mar. 24, 1885.

Witnesses:
Henry Bossert.
Harry Drury

Inventor:
Edouard Estienne
by his Attorneys
Howson & Son (No Model.) 6 Sheets—Sheet 3.
E. ESTIENNE.
MORSE REGISTER.
No. 314,525. Patented Mar. 24, 1885.
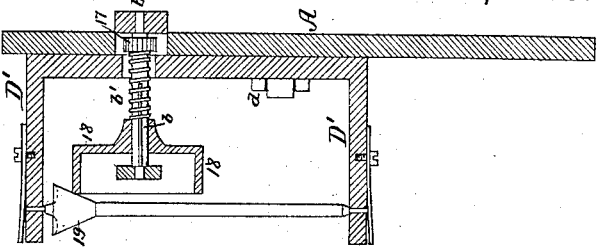
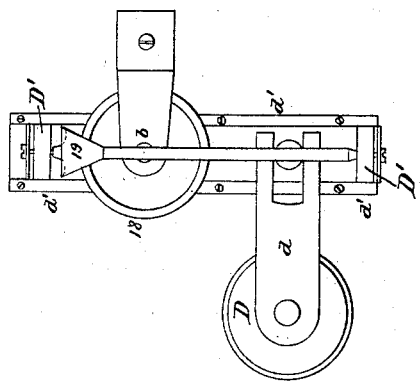
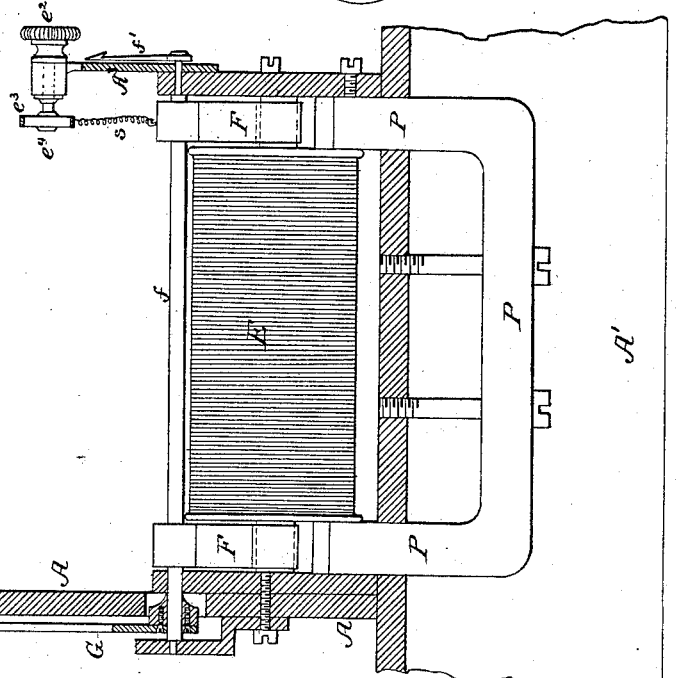
Witnesses:
Henry Bossert
Harry Drury
Inventor:
Edouard Estienne
by his Attorneys
Howson & Son (No Model.)  6 Sheets—Sheet 4.

E. ESTIENNE.
MORSE REGISTER.

No. 314,525.  Patented Mar. 24, 1885.

Witnesses:
John E. Parker
Harry Drury

Inventor:
Edouard Estienne
by his Attys.
Howson and Son (No Model.) 6 Sheets—Sheet 5.

E. ESTIENNE.
MORSE REGISTER.

No. 314,525. Patented Mar. 24, 1885.

Witnesses:
Henry Bossert.
Harry Drury

Inventor:
Edouard Estienne
by his Attorneys
Howson & Sons (No Model.) 6 Sheets—Sheet 6.
E. ESTIENNE.
MORSE REGISTER.
No. 314,525. Patented Mar. 24, 1885.
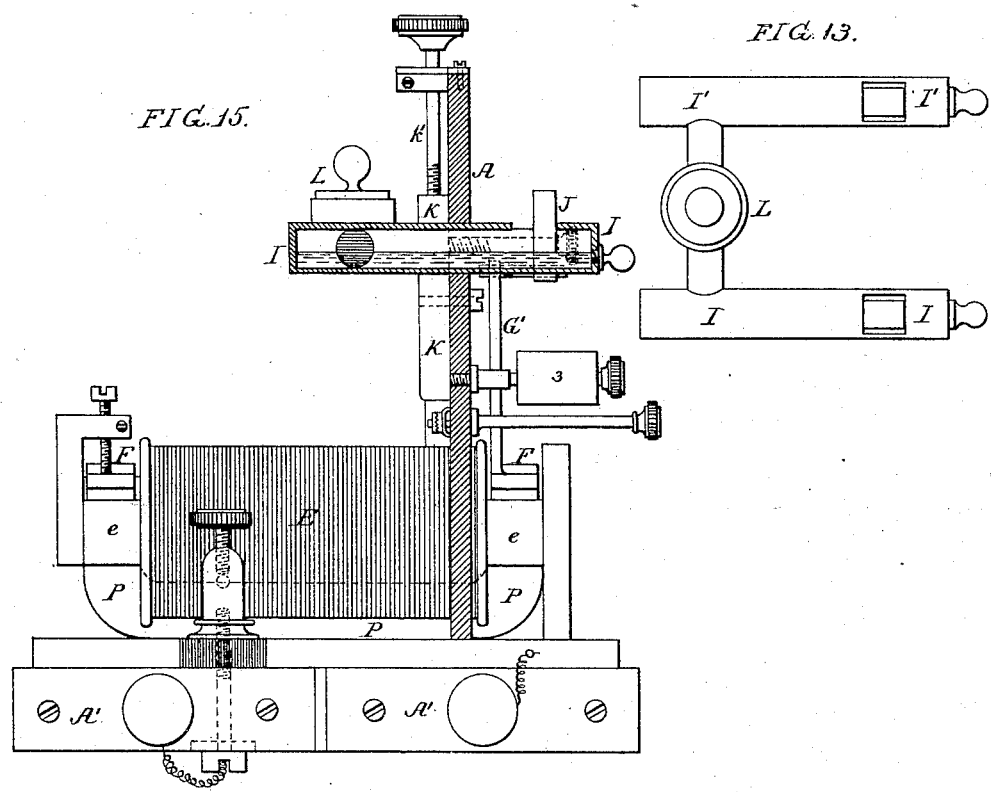
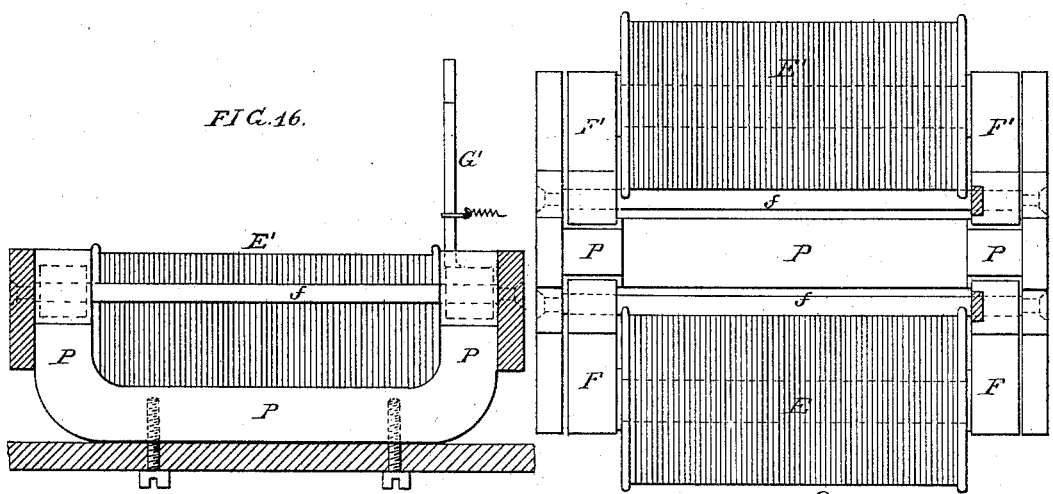
Witnesses:
John E. Parker
Harry Drury
Inventor:
Édouard Estienne
by his Attorneys
Howson and Son

UNITED STATES PATENT OFFICE.

EDOUARD ESTIENNE, OF PARIS, FRANCE.

MORSE REGISTER.

SPECIFICATION forming part of Letters Patent No. 314,525, dated March 24, 1885.

Application filed November 6, 1882. (No model.) Patented in France November 19, 1881, No. 145,920; in England July 29, 1882, No. 3,595; in Belgium September 6, 1882, No. 58,958; in Italy September 16, 1882, No. 14,595; in Germany October 17, 1882, No. 24,170; in Austria-Hungary November 29, 1882, No. 32,222; in Russia December 6, 1882; in Sweden March 9, 1883, and in Spain June 8, 1883, No. 4,065.

*To all whom it may concern:*

Be it known that I, EDOUARD ESTIENNE, a citizen of the Republic of France, and residing in Paris, France, have invented Improvements in Electric Telegraph Apparatus, (for which I have obtained French Patent November 19, 1881, No. 145,920, and patents in Great Britain, No. 3,595, July 29, 1882; in Belgium, No. 58,958, September 6, 1882; in Italy, No. 14,595, September 16, 1882; in Austria-Hungary, No. 32,222, November 29, 1882; in Germany, No. 24,170, October 17, 1882; in Spain, No. 4,065, June 8, 1883; in Sweden, March 9, 1883, and in Russia December 6, 1882,) of which the following is a specification.

My invention consists in improvements in the construction of electric telegraph apparatus of the class usually termed "telegraphic ink-writing registers," as fully described and claimed hereinafter.

Figure 1:
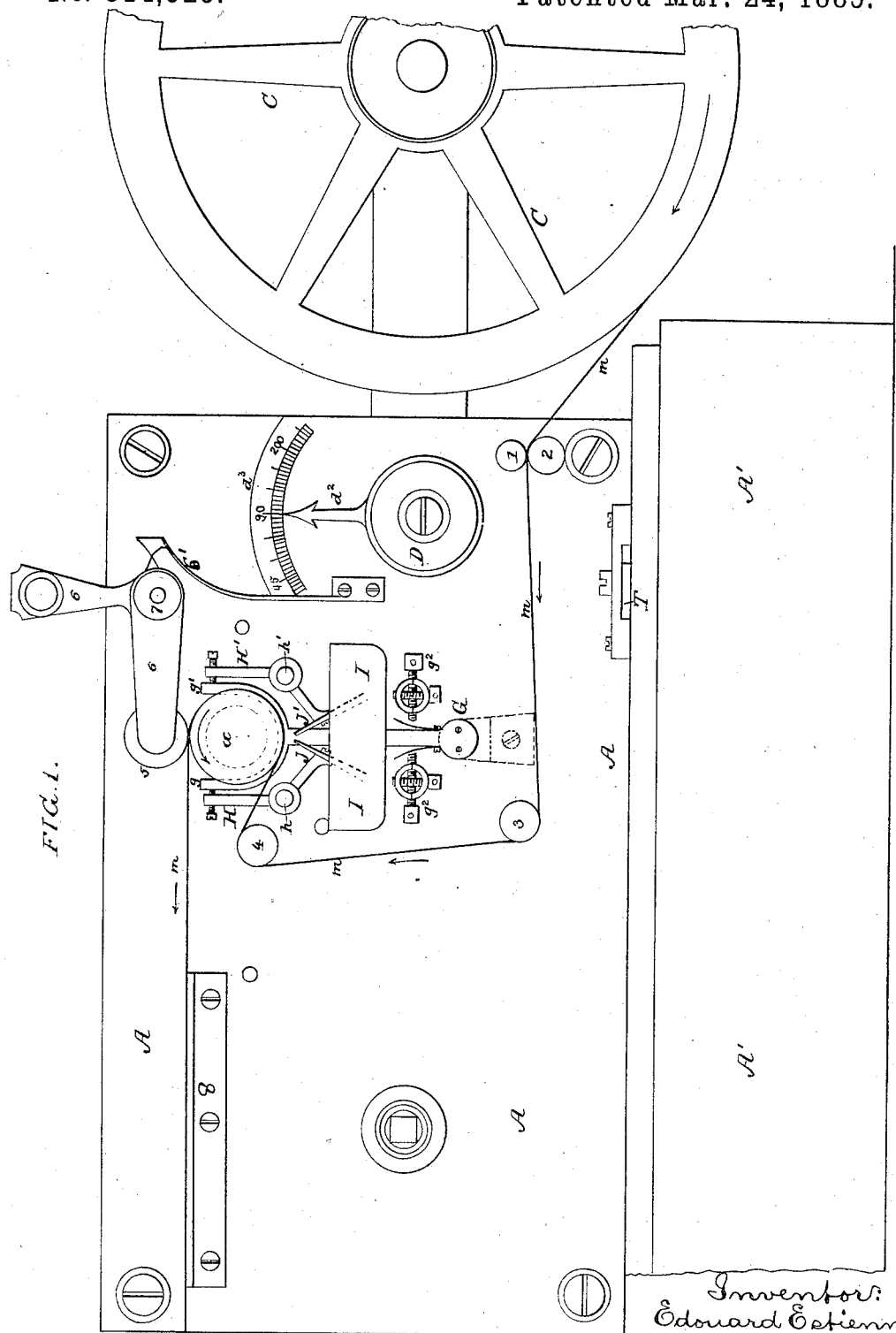
Figure 2:
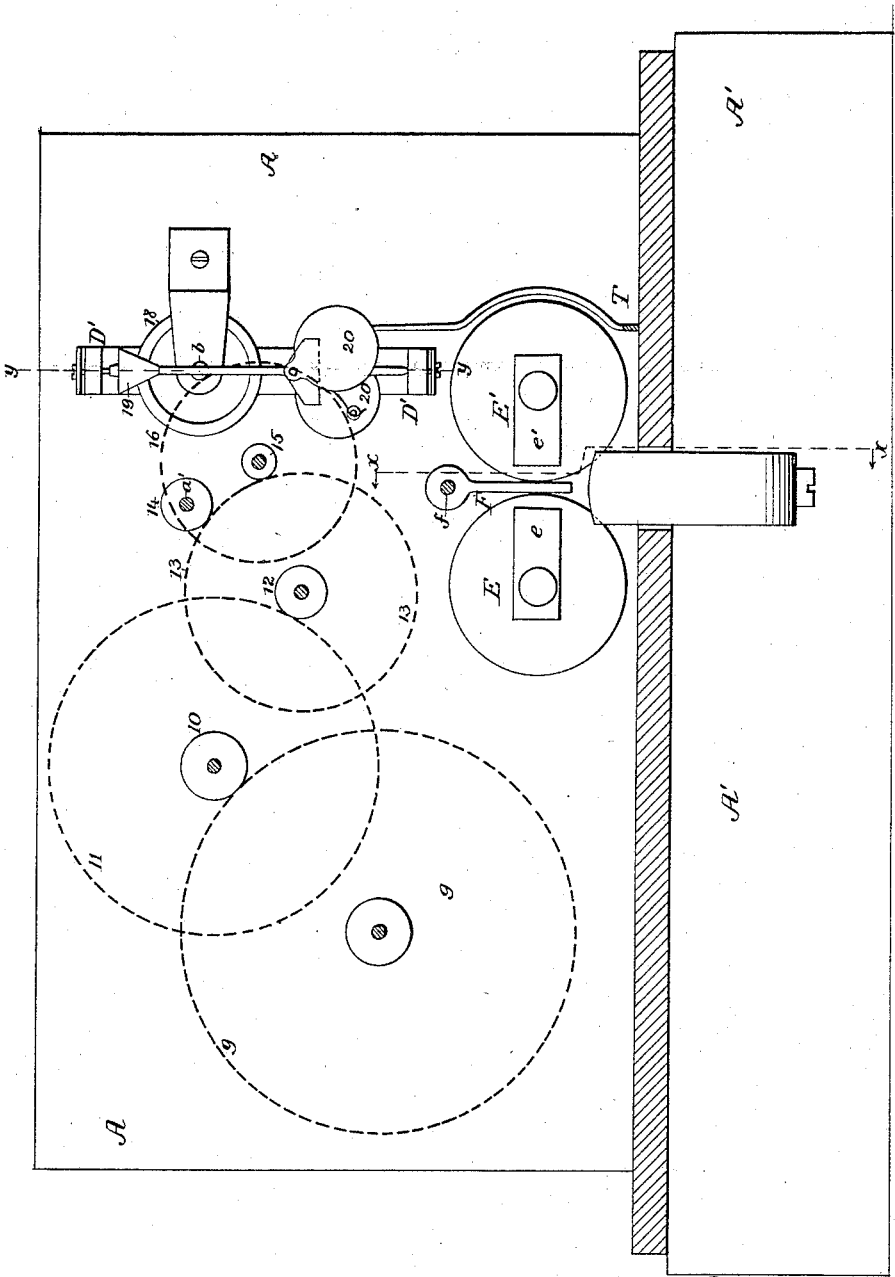
Figure 6:
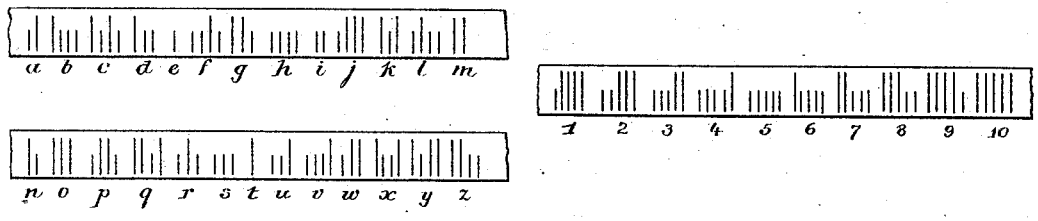
Figure 14:
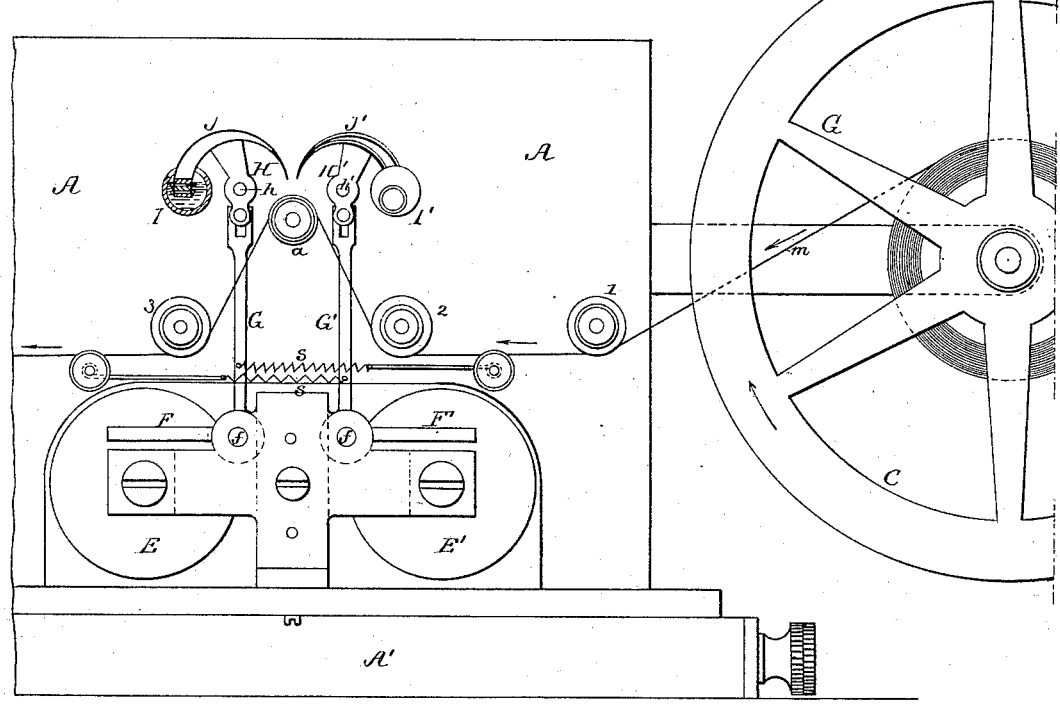
Figure 7:
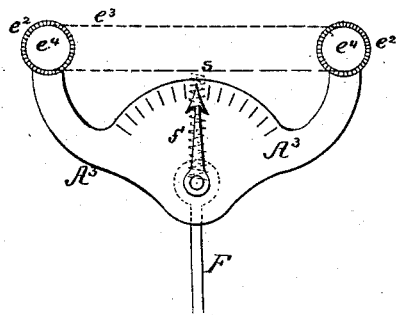
Figure 8:
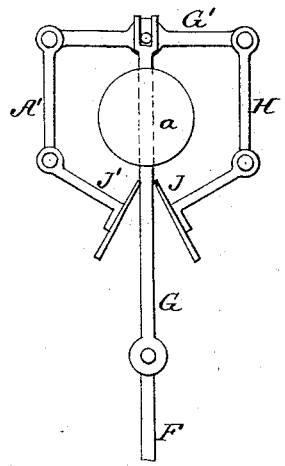
Figure 9:
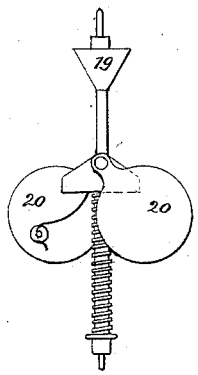
Figure 10:
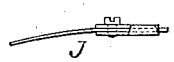
Figure 11:
Figure 12:

In the accompanying drawings, Figure 1 is a side view of my improved telegraphic instrument. Fig. 2 is a longitudinal section immediately behind the front plate. Fig. 3 is a transverse section on the line $x$ $x$. Fig. 4 is a transverse section on the line $y$ $y$, illustrating the speed-regulating apparatus. Fig. 5 is a detached view of the speed-regulator. Fig. 6, Sheet 5, illustrates the telegraphic characters printed on my machine. Fig. 7 is a detached view of the adjusting and indicating devices for the armature. Fig. 8 is a view of a modification of the pen-operating devices. Fig. 9 is a view of a modification of the speed-regulator. Figs. 10, 11, and 12 illustrate the form of pen used in my machine. Fig. 13 is a plan view of a modified form of ink-well which may be used. Fig. 14 is a face view of a modified form of register; Fig. 15, a transverse section of the same. Fig. 16 is a transverse section showing the constructions of the permamanent and electro magnets and armatures. Fig. 17 is a plan view of the same partly in section.

As will be seen on reference to Fig. 6, the telegraphic characters are formed of long and short dashes; or, as they may be termed, "full and half length strokes," placed transversely on the paper or tape, instead of running longitudinally, as in the ordinary Morse system, and in my machine the different characters do not depend on the variations in the length of contact, but to the different character of current sent to line, the full-length stroke, for instance, being formed when a positive current is sent to line, and the half-length stroke when a negative current is sent, or vice versa. The duration of each contact is precisely the same, so that the messages can be sent with much greater rapidity than with the system of dots and dashes running lengthwise of the tape, and the characters, when formed, require the use of less paper, and are more easily read when printed.

In Fig. 6 I have shown the combinations of full and half length strokes which may be used to represent the different letters of the alphabet and numbers. These full and half length strokes are formed through the medium of two ink-pens, one of which has a long point for the long stroke and the other a short point for the half-length stroke, and these pens are operated by sending to line either a negative current or a positive current, as may be required for the formation of the full or half length stroke.

Referring to Figs. 1, 2, and 3, A A is the casing of the instrument, and A' is the base, and between the front and back plates of the base are contained the usual clock-movements to feed the paper, which is drawn from the reel C, Fig. 1, and is represented by the letter $m$, passing first between two guide-rollers, 1 and 2, over rollers 3 and 4, and then around a feed-roller, $a$, to which motion is imparted, as hereinafter described, and thence over a guide, 8.

The paper is kept in contact with the feed-roller $a$ by means of a pressure-roller, 5, carried by a lever, 6, pivoted to the casing at 7, so that the roller 5 can be thrown into or out of contact with the feed-roller $a$, as desired, and held in either position by means of a spring, 6'.

The clock-work mechanism, as indicated in Fig. 2, may consist of the usual spring-barrel, to be wound up by means of a key, and a train of gears, 9, 10, 11, 12, and 13, the last gearing into a pinion, 14, on the shaft $a'$, Fig. 2, which carries the feed-roller $a$. In order to regulate the speed at which the feed-roller $a$ is driven through this train of gears, I may make use of any suitable device, and have illustrated in Figs. 2, 3, and 4 a form which I prefer to employ.

The wheel 13, through a pinion and spur-wheel, 15 and 16, imparts motion to a pinion, 17, on a shaft, $b$, Figs. 2 and 4, mounted in bearings in the frame, and this shaft $b$ carries a friction-wheel, 18, which turns therewith, but can have a limited longitudinal motion on it. The inner face of this wheel 18 is in contact with a cone, 19, having bearings in a bracket, D', which is adapted to guides $d'$, Fig. 5, on the inner face of the back plate of the frame A of the machine, so that the bracket can be raised or lowered to a limited extent to change the point of contact between the cone 19 and wheel 18, and the latter is kept in contact with the cone by means of a spiral spring, $b'$, Fig. 4, interposed between the pinion 17 and wheel 18. When the bracket is lowered, the cone 19 will press with increased friction on the wheel 18 and so retard the speed of the gear-wheels of the machine, while, when the bracket is raised, the frictional contact between the wheel 18 and cone 19 will be less, and the machine will operate at a higher speed.

To raise and lower the bracket, I may make use of a forked arm, $d$, on the inside front plate of the machine, and which is carried by the axis of a knob, D, under the control of the operator, Fig. 1, and this knob carries a pointer, $d^2$, which, in connection with the graduated scale $d^3$, indicates the speed at which the machine is running.

If desired, the regulating-cone 19 may be provided with the pivoted vanes 20 and counter-spring 21, as shown in Fig. 9, and as sometimes employed in the Morse instruments. The machine may be stopped or started by means of the usual lever, T, Fig. 1.

Referring, now, to the device for producing the marks on the paper, E E' are two electro-magnets within the casing of the instrument, and each provided with polar extensions $e\ e'$ at opposite ends, these polar extensions facing each other, and between them are the pendent armatures F, carried by the axis $f$, of brass, which is mounted in suitable bearings in the frame, and to the front end of this axis is secured an arm, G, which is forked at its upper end at $g\ g'$, and is adapted to act on two levers, H H', pivoted to the case at $h\ h'$, Fig. 1, and carrying at their lower ends pens J J'. The extent of motion of the armatures F, and consequently of the arm G, is regulated by means of set-screws $g^2$, Fig. 1.

Below the electro-magnets E E', and between them and immediately in line below the armatures F, is mounted a U-shaped permanent magnet, P, Figs. 2 and 3, the poles of which act on the armatures F, and tend to keep them in line midway between the poles $e\ e'$ of the two electro-magnets, thus acting as the retractor from both. To assist the action of this permanent magnet, I may make use of a retractile spring, $s$, Fig. 3, which may be adjusted to tend to return the armatures midway between the poles of the electro-magnet, (as does the permanent magnet,) or, if desired, to assist either of the electro-magnets. For this purpose the spring $s$ is carried by an adjustable band, $e^3$, Figs. 3 and 7, passing over small wheels $e^4$, either of which can be manipulated to adjust the spring by means of milled heads $e^2$.

If desired, the axis $f$ of the armatures may carry at its rear end an index-finger, $f'$, to show the position of the armatures on the outside of the case, in connection with the graduation-marks on the attachment $A^3$, Fig. 7, which carries the adjusting-strap $e^3$, and is secured to the frame of the machine.

The pens J J' are formed of small flat tubes, one of about twice the width of the other, so that one will form a long stroke transversely of the paper, while the other will form a short transverse stroke. Within these flat tubes I place small pieces of fine sponge or other equivalent material, and the enlarged rear ends of the pens, with their sponge, when at rest, dip into an ink-trough, I, (shown in Fig. 1,) so as to have a constant supply of ink drawn to the points of the pens by capillary attraction.

When the arm G, by the action of one or both of the electro-magnets E E', is moved, say, to the right, the pen J' will be raised into contact with the paper to form, say, a full-length stroke, and when the arm G is moved in the contrary direction by the action of the electro-magnets the pen J will be thrown into contact with the paper to form, say, a half-length stroke; and the electro-magnets E E' are so wound that, when a negative current is sent to line, the armatures F will be attracted, say, by the electro-magnet E, and repelled by E', and, when a positive current is sent over the line, the reverse action will take place, so that each time a current is sent to line one or other of the pens J J' will be operated to form either a long or short stroke on the paper, and this will depend upon the negative or positive character of the current, instead of on the duration of the current or the length of time the circuit is left open.

The arm G may be connected to the pen-levers H H', as shown in Fig. 8, by means of a link, G', as will be readily understood without further explanation.

In the modifications shown on sheets 5 and and 6 there are two electro-magnets, E E', and the permanent magnet P is arranged between the two electro-magnets. There are in this case two axes, $f$, having two pairs of armatures, F F', these axes $f$ being so arranged that the pivoting-points of the armatures are close to but not in contact with the poles of the permanent magnet.

The armatures F F', or their axes $f$, carry arms G G', which at their outer ends are forked to act on the bent levers H H', pivoted at $h\ h'$ to the case of the instrument. These bent levers carry curved or horn-shaped pens $J\ J'$, whose rear ends, when not acted on by the arms $G\ G'$, rest in the ink-troughs $I\ I'$. The curved pens $J\ J'$ are hollow, and contain some porous material to take up the ink and carry it to the points of the pens.

Immediately below the latter is mounted the feed-roller $a$, over which the paper $m$ passes from the reel C and around the guide-rollers 1 2 3. This feed-roller $a$ has its axis mounted in a plate, $k$, Fig. 15, on the inside of the front plate of the instrument and adjustable vertically by means of a screw-rod, $k'$, so that the feed-roller may always be brought to the proper position in relation to the pens.

To assist the permanent magnet P in returning the armatures $F\ F'$ after each current, adjustable retracting-springs, $s$, Fig. 14, are used. The operation of this instrument is similar to that before described, the electro-magnets $E\ E'$ being so wound that when a negative current is sent to line from the transmitting-station one pair of armatures will be attracted while the other is repelled, and one of the pens will make its corresponding mark upon the paper; and similarly, when a positive current is sent to line the other pen will be operated to make its mark on the paper, the point of one pen being narrow and the point of the other broad, for the formation of the long and short dashes or strokes.

The two ink-troughs $I\ I'$, mounted in the front plate of the instrument, may be connected to each other through a suitable reservoir, L, as shown in Fig. 15, and plan view, Fig. 13.

I am aware of the Herring telegraph apparatus described in his British Patent No. 2,845 of 1870, and United States Patent No. 121,102, November 21, 1871, and therefore do not claim anything therein shown and described.

I claim as my invention—

1. The combination of the feed-roller of a telegraphic register and two levers, one carrying a marking-pen having a wide point to form a long stroke and the other a narrower point to form a short stroke, with armatures and electro-magnets acting on the latter and an arm or arms moving with the armatures to operate the pen-levers, substantially as set forth.

2. The combination of the feed-roller of a telegraphic register, and two levers carrying marking-pens of different character, with armatures controlling said pen-levers electro-magnets to act on said armatures in one direction or other, according as a negative or positive current is sent, and a permanent magnet acting as a retractor on said armatures to return them to their normal positions, all substantially as described.

3. The combination of the feed-roller of a telegraphic register, and two marking-pens of different character, with armatures controlling the said marking-pens, electro-magnets having poles facing each other on opposite sides of the armatures, and a permanent magnet in line with the armatures and acting thereon to retract them to a position midway between the poles of the armatures, substantially as specified.

4. The combination of the feed-roller of a telegraphic register, and two marking-pens of different character, with armatures controlling said marking-pens, electro-magnets acting on said armatures, a permanent magnet to act on the armatures to return them to their normal positions, and a retracting spring or springs to assist the permanent magnet, substantially as described.

5. The combination of the feed-roller of a telegraphic register, and two marking-pens of different character, with armatures controlling said marking-pens, electro-magnets having poles facing each other on opposite sides of the armatures, a permanent magnet to act on the armatures and return them to the said position, and a spring acting on the armatures, and adjustable, substantially as set forth, to assist either electro-magnet in its action on the armatures.

6. The combination of the feed-roller of a telegraphic register, and pivoted levers carrying marking-pens consisting of flattened tubes containing sponge or similar material, with an ink trough or troughs in which the rear ends of the pens dip and electro-magnets for operating the pen-levers, substantially as set forth.

7. The combination of the feed-roller of a telegraphic register, operating-spring, and train of gears, with a speed-regulator consisting of a shaft driven by gearing and carrying a yielding bevel-wheel, and an adjustable friction-cone in contact with the said bevel-wheel, all substantially as described.

8. The combination of the feed-roller of a telegraphic register, operating-spring, and train of gears, with a frictional speed-regulator and an adjusting-knob therefor on the outside of the case, substantially as set forth.

9. The combination of the feed-roller of a telegraphic register, operating-spring, and train of gears, with a speed-regulator, and an adjusting-knob therefor, and an indicator on the outside of the case, substantially as specified.

In testimony whereof I have signed my name to this specification in the presence of two subscribing witnesses.

EDOUARD ESTIENNE.

Witnesses:
ALFRED COINY,
ROBT. M. HOOPER.